Feb. 2, 1943.          A. RONNING                2,310,152
                       POWER SAW
              Filed March 11, 1940          3 Sheets-Sheet 2
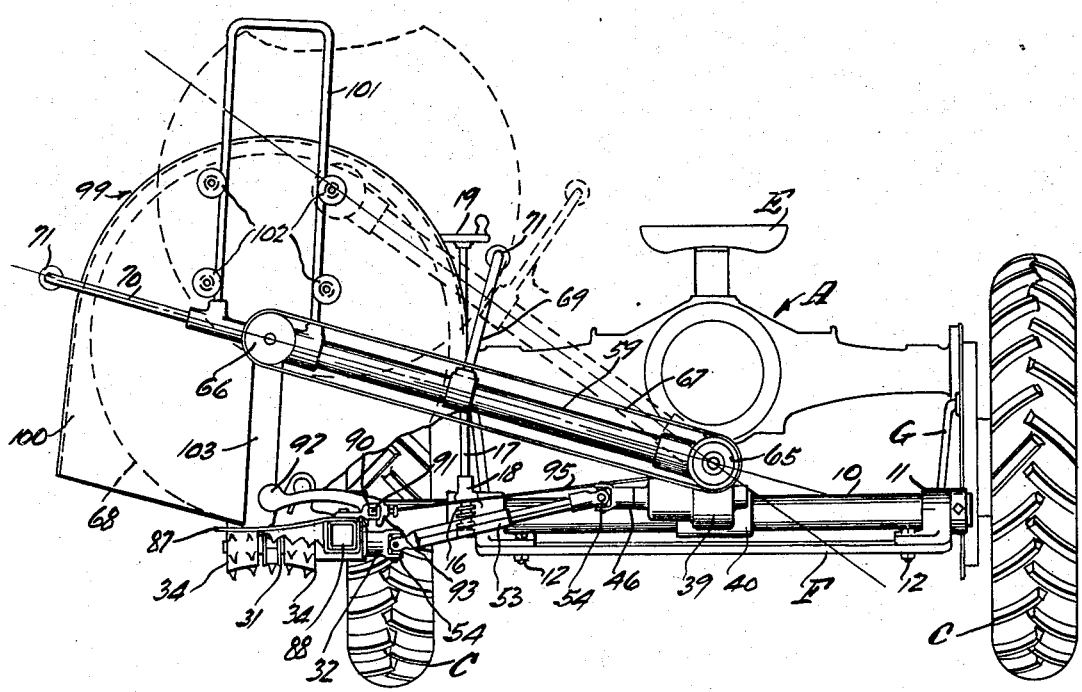
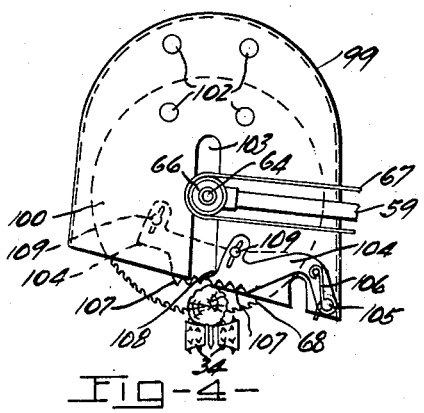
Fig-4-
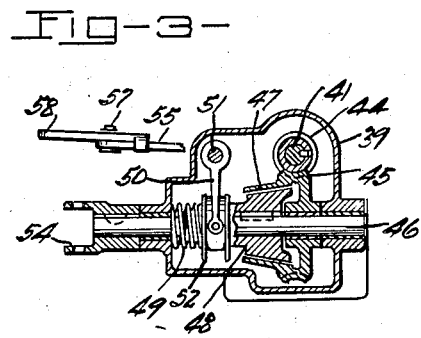
Fig-5-
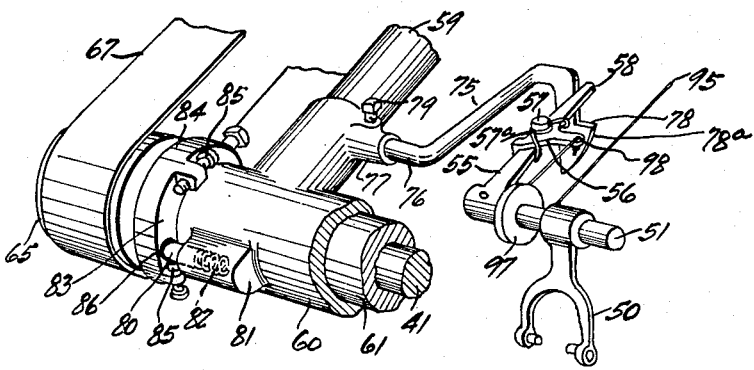
Fig-6-
INVENTOR
ADOLPH RONNING
BY Carlsen + Hazle
ATTORNEYS

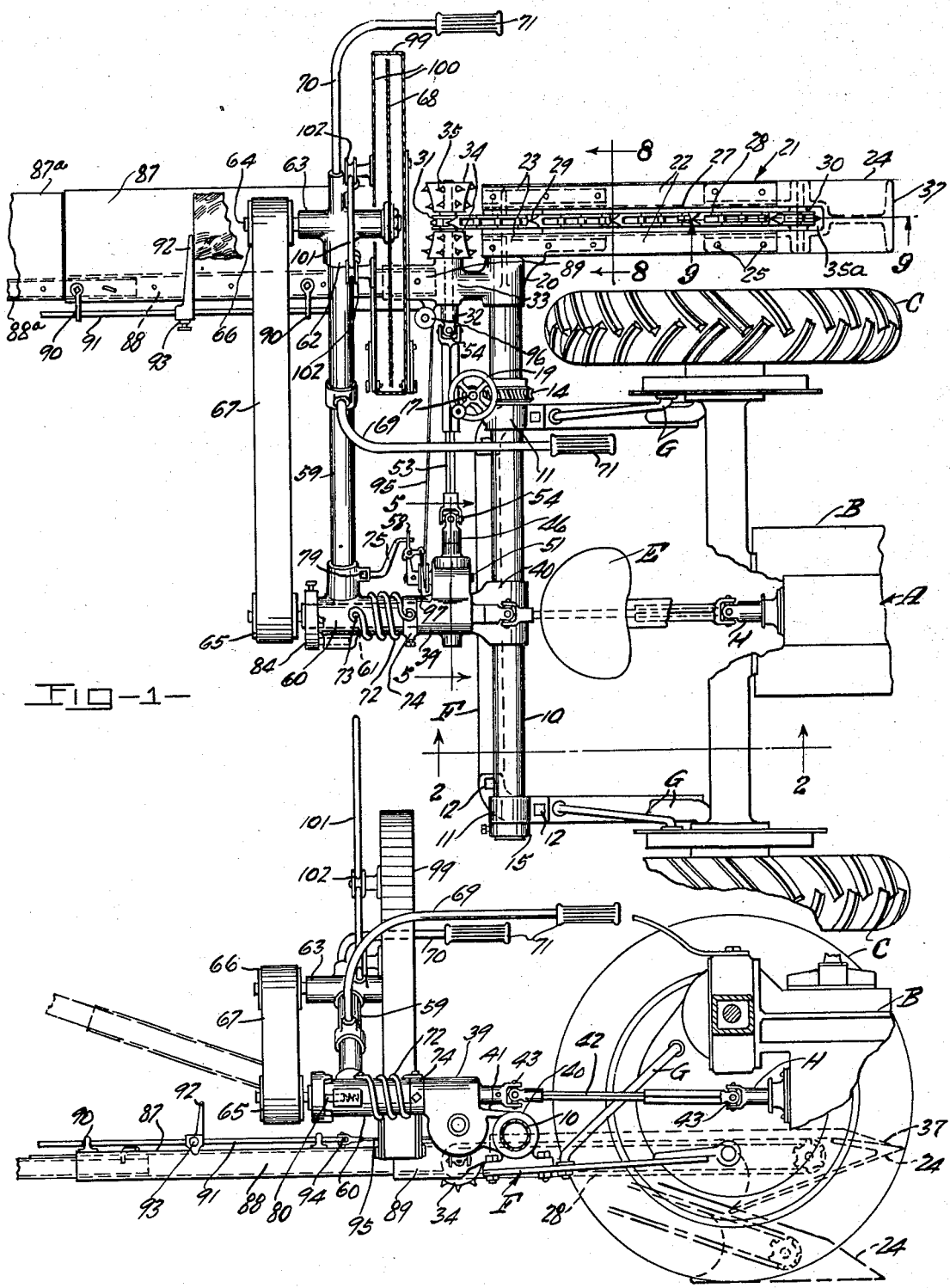

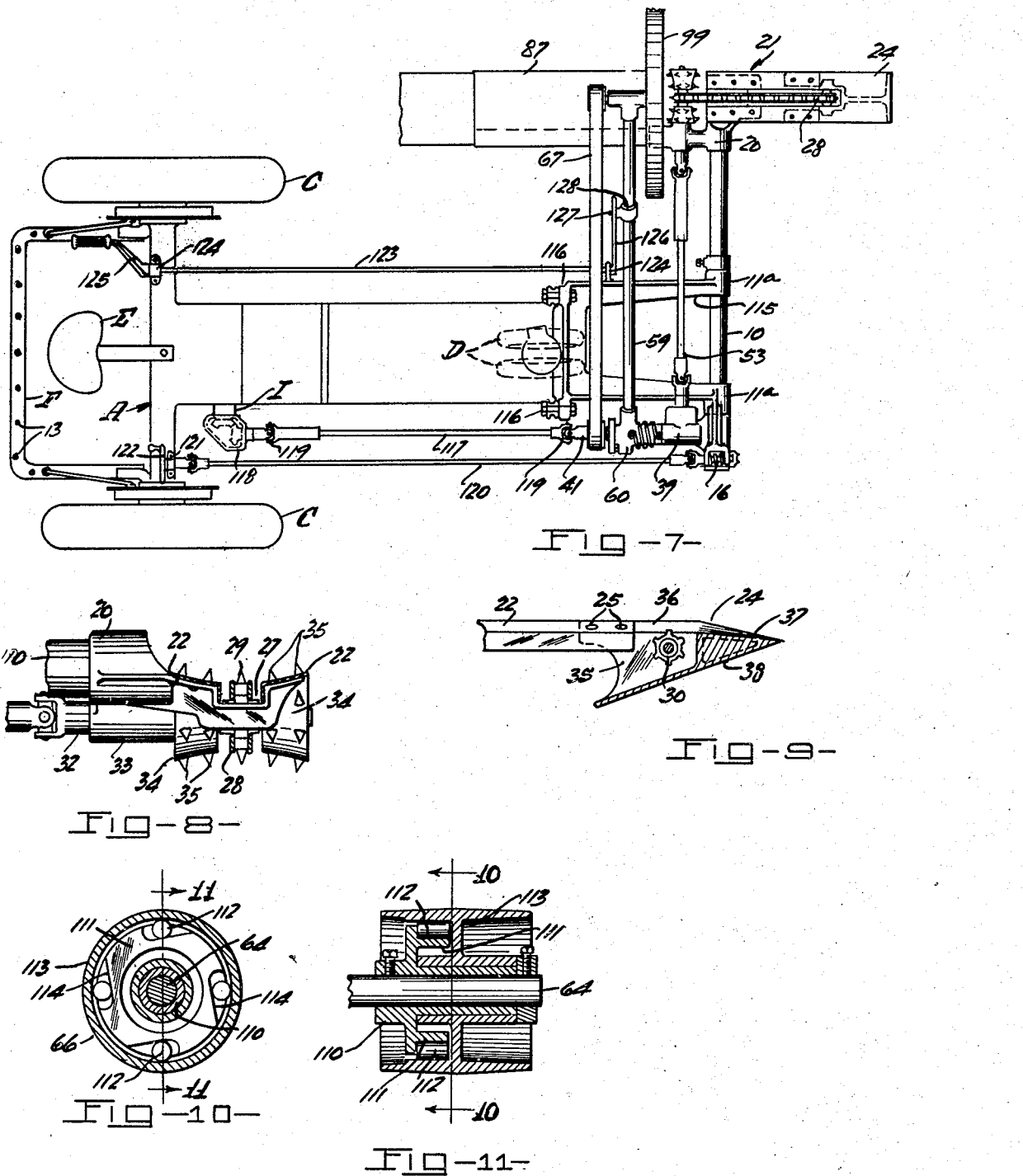

Patented Feb. 2, 1943

2,310,152

UNITED STATES PATENT OFFICE 2,310,152

POWER SAW

Adolph Ronning, Minneapolis, Minn.

Application March 11, 1940, Serial No. 323,354

12 Claims. (Cl. 143—43)

This invention relates to improvements in power actuated saws.

The primary object of the invention is to provide a tractor mounted saw actuated by the tractor engine and with power means for picking up logs or other timbers, feeding them to the saw and cutting them to any desired length. The machine may thus be used and operated by one man and for cutting timbers, railroad ties, poles, posts, cord wood and any other materials desired.

Another object is to provide a tractor mounted and operated saw which may be manipulated by the driver from his seat on the tractor, or another person standing alongside, and in which the necessary up and down movements of the saw as it is raised above the log and then fed downwardly therethrough will control the operation of the log feeding means so that under no circumstances will such feeding means move the log while the saw is in position to engage the log.

Another object is to provide an automatic means for stopping the feeding mechanism when the log has been moved to a desired location and position for cutting, said means being operated by contact of the log with a stop which is adjustable for cutting any desired lengths from the log.

A further object is to provide a guard for the saw itself which is movable independently of the saw and its arbor to normally move downwardly and protect or enclose all of the saw or the greatest possible part thereof.

Still a further object is to provide a means for preventing the log from rolling or turning as it is being cut.

These and other more detailed and specific objects will be disclosed in the course of the following specification, reference being had to the accompanying drawings, in which—

Fig. 1 is a plan view of the rear portion of a tractor showing my saw mounted thereon, parts of the saw being shown in cross section.

Fig. 2 is a longitudinal vertical section substantially in the plane indicated by the line 2—2 in Fig. 1, this view showing the feeding and pickup means in a lowered position in dot-dash lines.

Fig. 3 is a rear end view of the structure shown in Fig. 1 and showing the saw mechanism in a raised position in dotted lines.

Fig. 4 is a rear elevation, on a slightly reduced scale, of the saw, guard, and drive means and illustrating the application of gripping dogs for holding the log or timber from rolling as it is cut.

Fig. 5 is an enlarged cross section along the line 5—5 in Fig. 1.

Fig. 6 is a enlarged fragmentary and partially diagrammatic view of the saw driving and supporting means and showing the mechanism for controlling the feed mechanism.

Fig. 7 is a plan, somewhat reduced in scale, showing the saw arranged at the front of the tractor instead of at the rear.

Fig. 8 is an enlarged cross section along the line 8—8 in Fig. 1.

Fig. 9 is an enlarged longitudinal section along the line 9—9 in Fig. 1.

Fig. 10 is a diametrical cross section through the saw pulley showing the overrunning clutch therein, this view being indicated as taken on the line 10—10 in Fig. 11.

Fig. 11 is a cross section taken on the line 11—11 in Fig. 10.

Referring now with more particularity and by reference numerals to the drawings, a conventional form of general purpose tractor is designated at A and as shown comprises a chassis or frame B supported by large rear traction wheels C and smaller dirigible front wheels D. A power unit on the frame drives the wheels C. The operator's seat is at E at the rear of the tractor and over the draw bar F which is mounted in conventional fashion to the rear of the tractor by brackets G.

In Figs. 1 through 3, I have shown my saw as arranged at the rear of the tractor for operation by the usual rearwardly directed power take-off shaft H, while in Fig. 7 the saw is arranged at the frontal end of the tractor and is actuated by the laterally projecting shaft I on which the belt pulley is usually mounted. Both of these shafts H and I are under control of a clutch lever (not shown) on the tractor so that they may be run at will whether the tractor be moving or stationary, in the usual manner.

The saw and mounting assembly of Figs. 1–3 comprises a transversely extended tubular beam 10 which is journaled and carried in bearings 11 affixed by bolts 12 passed through suitable conventionally provided openings 13 in the draw bar F. A worm gear 14 is secured to the beam 10 outwardly of the (preferably) left hand bearing 11 and a collar 15 is secured at the opposite end of the beam so that these two parts prevent endwise displacement. A worm pinion 16 is carried at the lower end of a vertically axised control shaft 17 journaled in a bearing 18, and a handwheel 19 is provided on top of this shaft to turn the worm which, meshing with the gear 14, will oscillate the beam 10 about its axis as will be evident. The handwheel 19 is located conveniently to the hand of the driver in the seat E.

At its outer end the beam 10 carries a large, rigidly mounted bracket casting 20 on which is secured the forwardly directed log pickup and feeding mechanism designated generally at 21. This mechanism comprises spaced channels 22 which are secured at rear ends 23 to the casting 20 and extend forwardly in parallel spaced relationship to a pickup shoe 24 to which they are secured at 25. The spaced arrangement of these channels provides a central slot 27 therebetween in which is arranged a chain 28 carrying suitable teeth or dogs 29 to engage and urge a log endwise along the mechanism, the said channels, each sloping inwardly as clearly shown in Fig. 8 in order to center the log on the chain. At the forward end, the chain 28 is trained over a sprocket 30 journaled in the shoe 24 and at the rear it is placed over a drive sprocket 31 affixed to an outer end portion of a drive shaft 32 journaled at 33 in the casting 20. At each side of the sprocket 31 the shaft 32 carries tapered, truncate feed rolls 34 which engage the log and are provided with teeth 35 to grip and feed the log endwise.

The pickup shoe 24 has the slotted rear portion 35a to receive the forward end of the chain 28 and sprocket 30, and the upper side 36 is sloped inwardly toward the center from each side to guide and center the log to the chain. The nose 37 of the shoe angles downwardly to a point so that the end of a log may be slipped up into engagement with the chain and the flat underside 38 of the shoe is so disposed that the nose cannot dig into the ground. The entire mechanism 21 may of course, be swung up or down as the beam 10 is oscillated by handwheel 19 and the shoe 24 may thus be lowered to the ground and urged under the end of a log by forward movement of the tractor. When the log is engaged by the chain 28 it will then be fed endwise and rearwardly to the cutting position. During transport, the mechanism 21 is raised to substantially the horizontal position shown in Fig. 2.

A clutch housing 39 is secured by an offset sleeve 40 upon the beam 10 intermediate the bearings 11 and a drive shaft 41 is journaled longitudinally through said housing with its forward end projecting as shown. A telescopic connecting shaft 42 is connected by universal joints 43 with the power take-off shaft H and drive shaft 41 and operates to rotate the latter shaft at any position of the beam and associated parts, and of course under control of the clutch lever on the tractor. Within the housing 39 the shaft 41 carries a worm pinion 44 which meshes with a worm gear 45 loosely mounted on a transversely axised shaft 46 journaled in the housing. See Fig. 5. The gear 45 carries an annular clutch drum 47 within which operates a clutch head 48 slidably but non-rotatably mounted on the shaft 46, the said head being normally urged into a disengaged relation with the drum 47 by an expansion coil spring 49. A shifting fork 50 is carried by a fork shaft 51 journaled in the clutch housing above and at right angles to shaft 46 and said fork embraces a pulley 52 secured to clutch head 48 in such manner that, by turning the shaft 51, the clutch head may be engaged with the drum 47 against the resistance of the spring 49. Such action of course causes the rotation of the shaft 46 and this shaft is connected by a telescopic connecting shaft 53 and universal joints 54 to the shaft 32 to drive the log feeding chain 28. See Figs. 1 and 3. The fork shaft 51 carries an arm 55 at the rear end for shifting the fork and, as best shown in Fig. 6, said arm has a bell crank lever 56 pivoted at 57 and normally urged to a position in which the finger 58 forms an extension of the arm for a purpose which will appear. A spring 57a on the lever holds it in this position as shown.

The saw mechanism per se comprises an elongated hanger or supporting arm 59 which at one end carries a tubular bearing 60 by means of which it is journaled about a longitudinal axis upon a tubular rear extension sleeve 61 of the clutch housing. The outer end of the arm 59 may thus swing in an up and down transverse plane immediately to the rear of the log feeding mechanism 21. Said outer end of the arm is provided with a fixed casting 62 having a bearing 63 extended at right angles to the axis of the arm and the saw arbor or mandrel 64 is journaled in this bearing. The aforesaid shaft 41 extends rearwardly from the sleeve 61 and carries a pulley 65 in line with another pulley 66 on the arbor 64 and a belt 67 trained over these pulleys transfers the drive from the power take-off shaft H to the saw, again under control of course of the clutch lever on the tractor. A circular saw 68 is secured to the forward end of the arbor 64 to turn therewith and therefore may move up and down over and through a log resting on the feed mechanism 21 to cut through the same transversely.

Inner and outer handles 69 and 70 are secured to the arm 59 and carry the forwardly disposed hand grips 71 by which the arm and saw may be raised and lowered as desired. The inner handle is located conveniently close to the drivers seat E while the outer handle is extended laterally for operation by a man standing alongside the machine. A torsional coil spring 72 surrounds the bearing 60 and is anchored at one end 73 thereto while at the other end it is secured to a collar 74 rigidly affixed upon the sleeve 61. This spring is tensioned to at least partially counterbalance the weight of the arm and saw and facilitate the raising and lowering thereof.

An operating rod 75 is secured at its angularly turned end 76 in a socket 77 adjacent the pivoted end of the arm 59 and at an outer end the rod has a hook 78 which stands in the plane of the finger 58 carried by the clutch operating arm 55. See Fig. 6. In any lowered position of the saw this hook 78 stands below the finger 58 but as the saw is raised to clear the log the hook as it is carried up by arm 59 will engage and raise the finger, oscillating the shaft 51 and engaging the clutch head 48 with the drum 47. This action of course causes the feed mechanism to operate. The rod 75 may be locked at any adjusted position in the socket 77 by a set screw 79.

The sleeve 60 of the saw supporting arm 59 carries a pawl or detent pin 80 mounted in a lug 81 and the pin is urged by a coil spring 82 to engagement with the arcuate end face 83 of a stop ring 84 rigidly secured to the outer end of the sleeve 61. Adjustable stop screws 85 engage the pin 80 to limit both upward and downward movement of the arm and saw and in advance of the screw limiting upward movement a socket 86 is formed in said end face 83. As the saw is raised, therefore the pin 80 will first engage the socket 86 and at this time, the rod 75 being properly adjusted with respect to the arm 59, the hook 78 will just engage the finger

58. Forcible lifting of the saw past this point will unseat the pin 80 and at the same time the added movement on to the stop screw 85 will actuate the arm 55 to engage the clutch and cause operation of the feed mechanism. It is thus required that the operator lift the saw past the first stopping point, which is of course calculated to clear the saw from the log before the feed system will operate.

As the log is carried rearwardly by the feeding mechanism its end passes beneath the saw onto a rearwardly extended table or rest plate 87 which is of narrow elongated form and is secured by an inner margin to a beam 88 extended rigidly from a socket 89 formed in the casting 20. This table or plate 87 inclines downwardly and outwardly as best seen in Fig. 3 so that the cut ends of the log will of their own weight roll off clear of the machine and inasmuch as the entire saw mechanism operates in an inclined plane (see Fig. 2) the rear end of the table stands well above the ground so that there is a clearance for a goodly number of cut lengths as they fall. An additional extension table 87a may be provided by telescoping its beam 88a into the rear end of the main beam 88 if desired or necessary.

Brackets 90 are secured in spaced relation along the inner side of the table 87 and slidably support a stop rod 91 of square cross section. A stop arm 92 is removably clamped as at 93 to the rod 91 and extends therefrom outwardly over the table for engagement with the end of a log thereon as clearly shown in Fig. 1. The forward end of the rod 91 is connected at 94 with a cable 95 which is trained forwardly over a pulley 96, mounted in the casting 20, and extended therefrom inwardly over a pulley 97 on the clutch operating shaft 51 and finally outward to a connection at 98 with the bell crank lever 56. The assembly and arrangement is such that a rearward movement of the stop arm 92, caused by engagement of the log therewith, will exert a pull upon the cable 95 such that the bell crank lever 56 will be oscillated to swing its finger 58 clear of the hook 78. This action of course will only obtain at a time when the saw is raised and the hook 78 is holding the clutch engaged as has been previously described, and the movement of the finger 78 by the cable will cause it to swing clear of the hook whereupon the clutch will immediately spring open or to disengaged condition. The feed movement of the log is thus automatically stopped and it is obvious that by adjusting the stop arm 92 along the rod 91 the lengths cut from the log may be controlled and varied at will. As the saw is moved downward, the curved nose 78a of the hook 78 will pass the finger 58.

The saw 68 is enclosed by a guard 99 having sides 100 so spaced as to substantially clear the saw, and upper, inner, and outer sides of the guard are closed leaving only the bottom open, as shown. An inverted U-shaped yoke or stand 101 is carried rigidly in an upstanding position by the outer end of the saw supporting arm 59 and the rear side 100 of the guard 99 is provided with spaced, flanged rollers 102 which ride on inner and outer sides of the yoke so that the guards may move upwardly or downwardly with respect to the saw. A slot 103 in the rear side of the guard clears the saw arbor 64 for this purpose and the parts are of course so proportioned that the guard will at no time come in contact with the saw. This guard will of its own weight normally hang downwardly to completely protect the saw and will move freely as it rests on the log and the saw cuts its way downwardly therethrough so that only a minimum portion of the saw is exposed, even while cutting.

The guard, as best shown in Fig. 4, carries log gripping dogs 104, on both front and rear sides and these are pivoted on a pin 105 to stand downwardly against the log under influence of a spring 106 at each side. The dogs have teeth 107 on their undersides, which bear on the log to prevent the same from rolling or turning as it is cut and the rearmost dog is of course, cut short as indicated at 108 to clear the slot 103. The dogs may also be locked by set screws 109 in any positions desired.

In operation the beam 10 is rotated to a position in which the pickup shoe 24 will rest on, or very near the ground and the tractor is driven forwardly so that this shoe will slip beneath the end of the log or timber to be cut. The saw being then pulled upward to its full height and the clutch lever on the tractor moved to engaged position, the chain 28 will be operated to drag the saw rearwardly and upwardly beneath the saw. As the log strikes the stop arm 92, the feed mechanism is automatically disengaged and the saw may then be lowered by hand to cut through the log. The cut length will fall clear and return upward movement of the saw will again feed the log through for the next cutting. All of these operations may be carried out easily by the tractor operator and the tractor then moved over to the next log. For cutting random lengths the stop arm 92 is of course, removed and the operator controls the feed by upward and downward movements of the saw. It will be evident, therefore, that my machine provides the maximum of speed, flexibility, and safety for the sawing of lumber lengths of any desired kind.

The pulley 66 at the saw arbor 64, is as shown in Figs. 10 and 11, of the overrunning type in which an inner section 110 is secured to the arbor and has an outer flange 111 against which runs rollers 112 mounted within the free outer section 113. These rollers are located in angular notches 114 so that, in the driven direction of rotation, they will wedge or bind and cause the operation of the pulley as a unit. When however, the saw is shut off by operation of the clutch on the tractor, the pulley will run free under the momentum of the saw allowing it to run down gradually and relieving the parts of strain.

In Fig. 7 I show the saw structure mounted at the forward end of the tractor instead of at the rear as has been described. In this case the main elements of the saw structure are identically the same as the rear mounted version and wherever necessary are referred to by the same reference characters. The beam 10 is journaled in bearings 11a which are carried by a bracket 115 secured at 116 to the tractor in the position at which the cultivator is usually bolted on such tractors. The drive for the saw and feed mechanism is connected to the rear end of the shaft 41 by a drive shaft 117 extending rearwardly and connected through a bevel gear transmission 118 to the laterally projecting belt pulley shaft I, the necessary universal joints 119 being of course, provided as shown. Obviously, however, the machine might here again be driven from the power take-off shaft H as has been described. The beam 10 is rotated by the worm 16 which in this case is actuated by a shaft 120 extending rearwardly through a bracket 121 to a handwheel 122 convenient to hand of operator.

For raising and lowering the saw from the operator's seat I provide an elongated shaft 123 journaled alongside the tractor in bearings 124 and provided at the rear end with a hand lever 125. At the forward end of the shaft an arm 126 is affixed and engages the pin 127 of a collar 128 secured to the arm 59 so that the hand lever may be manipulated to swing the arm about its pivotal connection in the manner set forth. Further details of the construction and operation of this embodiment of my invention will, it is thought, be apparent without further description herein.

For the sake of clarity in the reduced scale showing of Fig. 7 the clutch operating mechanism and certain other minor details are not shown but they are of course of the same construction as detailed hereinbefore.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A tractor mounted power saw, comprising a saw swingably supported on the tractor and operable thereby, a feeding mechanism for moving a timber toward the saw for cutting thereby, a clutch for connecting said feeding mechanism to the tractor for power operation thereby, a clutch control device for engaging the clutch only when the saw is in a position in which it clears the path of the timber, means normally limiting movement of the saw away from the timber to a point at which said clutch will not be engaged but manually releasable for further movement of the saw, and means operated by such further movement of the saw for engaging the clutch.

2. A tractor mounted saw, comprising a beam journaled transversely on the tractor, a feed device secured at one end to the beam for movements in an upright longitudinal plane, a shoe at a forward end of the feed device for engagement beneath a log in a lowered position of the device and in response to forward movement of the tractor, power actuated means for advancing the log upwardly and rearwardly along said feed device, and means for sawing off the log as it is advanced by the feed means.

3. A tractor mounted saw, comprising a beam journaled transversely on the tractor, a feed device secured at one end to the beam for movements in an up and down longitudinal plane, means for rotating the beam about its axis to raise and lower the feed device, a shoe at a forward end of the feed device for engagement beneath a log in a lowered position of the device and in response to forward movement of the tractor, power actuated means for advancing the log upwardly and rearwardly along said feed device, and means for sawing off the log as it is advanced by the feed means.

4. A tractor operated saw, comprising a beam journaled transversely on the tractor, a feed device secured at one end to the beam for up and down movements in a longitudinal plane, the said device comprising spaced parallel and inwardly sloping channels, a chain operable between the channels, a forwardly pointed shoe at the forward end of the channels and movable beneath the end of a log by forward movement of the tractor to thereby cause the chain to engage and feed the log rearwardly, and a circular saw power actuated by the tractor and movable in a crosswise direction at the rear of the feed device for cutting end lengths of the log as it is moved rearwardly.

5. A tractor operated saw comprising a beam journaled transversely at the rear of the tractor, means operable from the tractor seat for oscillating the beam, a log pickup and feed device supported alongside the tractor by the beam for up and down movements in a longitudinal plane, an arm swingably supported from the beam and movable from the tractor seat in up and down directions transversely with respect to the feed device, a saw on an outer end of the arm, and power means for operating both the feed device and the saw.

6. A tractor mounted saw comprising a beam journaled transversely at the forward end of the tractor, means extending rearwardly for operation from the tractor seat for rotating the beam, a log pickup and feed device supported by the beam for up and down movements in a longitudinal plane, an arm swingably supported for up and down movements in a transverse plane and extending at an outer end over the feed device, a saw on the outer end of the arm, means extended to the rear of the tractor for operation from the seat for swinging the arm and saw toward and away from the feed device, and power operated means for operating the feed device and the saw.

7. A power saw mounted on a tractor and comprising, an arm mounted on the tractor for upward and downward movements with respect thereto, a saw operatively mounted on the arm, a feeding mechanism for advancing and supporting a timber in cutting position beneath the saw, power means connected for operating the feeding mechanism and including a clutch for engaging and disengaging the connection between power means and feeding mechanism, an operating arm on the clutch, a movable finger on the operating arm, a hook carried by the saw supporting arm in position for engaging the said finger member and actuating the operating arm to engage the clutch as the saw is swung upwardly away from the timber, and means operated by advance movement of the timber for swinging the finger member clear of the hook in the raised position of the saw and thereby disengaging the clutch.

8. A power operated saw comprising a saw support arm having an oscillatable bearing at one end by which it is supported for swinging movements, a saw on the arm, a prime mover connected to operate the saw, timber feeding means for advancing and supporting a timber in the path of the saw for cutting thereby, means including a clutch for connecting or disconnecting the prime mover and feeding means, a pawl carried by the bearing, a rigid member supported adjacent the bearing and having spaced stops adapted to be contacted by the pawl to positively limit swinging movement of the saw toward and away from the timber, the said rigid member also having means for frictionally and releasably engaging the pawl to normally halt movement of the saw away from the timber short of the positive limit of such movement, and means responsive to movement of the saw from its normally limited position to its positively limited position for actuating and engaging the clutch to thereby advance a timber on the feeding means.

9. A power operated saw comprising a saw supporting arm having a bearing member at one end mounted for oscillating movements and by which the arm is supported for swinging movements in upward and downward directions, a power operated saw on the arm, mechanism for feeding and supporting a timber beneath the saw in position for cutting by downward movement of the saw, a pawl carried by the bearing member, a rigid member supported adjacent the bearing, adjustable stops mounted on the rigid member and disposed in the path travelled by the pawl as the bearing member oscillates to thereby positively limit upward and downward movement of the arm and saw, the said rigid member also having a recess for frictional engagement with the pawl to normally limit upward movement of the arm and saw short of the positive limit of such movement, the said pawl being manually releasable from the recess by forcible upward movement of the arm to permit the further upward movement of the saw to its positive limit, and means operated by said further movement of the arm and saw for engaging the said clutch.

10. A power operated circular saw, comprising a frame member supported for movement toward and away from the work, a shaft extended from the frame member and supporting the saw, a guard adapted at one edge to contact the work and having spaced sides to loosely enclose the saw, means supporting the guard for movement relative to the saw as the saw enters the work, the said guard having a slot in one side to clear the shaft, the said slot extending through the work engaging edge of the guard, work holding dogs mounted on each side of the guard, and the dog on the slotted side of the guard being cut short to clear the said slot and shaft.

11. A power operated circular saw, comprising a frame member supported for movement toward and away from the work, a shaft extended from the frame member and supporting the saw, a guard adapted at one edge to contact the work and having spaced sides loosely enclosing the saw, means movably supporting the guard whereby the saw may move outwardly to the work through the said work engaging edge of the guard, dogs on the work engaging edge of the guard, the said dogs being oscillatably mounted, and means yieldably urging the dogs toward and into engagement with the work.

12. The combination with a tractor, of a timber saw operatively arranged on the tractor, a feed device operated by the tractor for feeding a timber to the saw, and a pickup means disposed for engagement beneath a timber and operative by forward travel movement of the tractor to elevate and guide the timber into operative engagement with the feed device.

ADOLPH RONNING.